US011316419B2

(12) United States Patent
Ling et al.

(10) Patent No.: US 11,316,419 B2
(45) Date of Patent: Apr. 26, 2022

(54) LINEAR VIBRATION MOTOR

(71) Applicant: AAC Technologies Pte. Ltd., Singapore (SG)

(72) Inventors: Fanghua Ling, Shenzhen (CN); Feng Tao, Shenzhen (CN); Xiaofeng Pu, Shenzhen (CN); Mengxun Shi, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 371 days.

(21) Appl. No.: 16/706,856

(22) Filed: Dec. 9, 2019

(65) Prior Publication Data

US 2020/0212786 A1 Jul. 2, 2020

(30) Foreign Application Priority Data

Dec. 30, 2018 (CN) .......................... 201822278807.8

(51) Int. Cl.
*H02K 33/02* (2006.01)
*H02K 33/18* (2006.01)
*B06B 1/04* (2006.01)
*H02K 33/16* (2006.01)

(52) U.S. Cl.
CPC .............. *H02K 33/18* (2013.01); *B06B 1/045* (2013.01); *H02K 33/02* (2013.01); *H02K 33/16* (2013.01)

(58) Field of Classification Search
CPC .......... H02K 1/34; H02K 33/02; H02K 33/06; H02K 33/16; H02K 33/18; B06B 1/045
See application file for complete search history.

(56) References Cited

FOREIGN PATENT DOCUMENTS

| CN | 108054894 A1 | 5/2018 |
| CN | 209389915 B1 | 9/2019 |

OTHER PUBLICATIONS

PCT search report dated Jan. 10, 2020 by SIPO in related PCT Patent Application No. PCT/CN2019/110615 (4 Pages).

*Primary Examiner* — Ramon M Barrera
(74) *Attorney, Agent, or Firm* — W&G Law Group

(57) ABSTRACT

An exemplary embodiment of the present invention provides a linear vibration motor including a base with an accommodation space a vibrating unit, an elastic part suspending the vibrating unit, and a coil assembly fixed to the base. The vibrating unit includes a weight block with a through hole, a pole plate accommodated in the through hole, and at least one magnet fixed at the pole plate. The pole plate includes first side walls and second side walls. The at least one magnet is fixed to the first side wall, and a thickness of the second side wall is greater than a thickness of the first side wall. The linear vibration motor partially enlarges the pole plate so as to improve the magnetic field intensity, and then the magnetic flux is increased correspondingly so as to make the vibrating performance of the linear vibration motor better.

4 Claims, 3 Drawing Sheets

LINEAR VIBRATION MOTOR

FIELD OF THE PRESENT INVENTION

The present invention relates to a motor, particularly a linear vibration motor applied in the field of mobile electronic products.

DESCRIPTION OF RELATED ART

With the development of electronic technology, portable consumer electronic products are more and more favored by people, such as mobile phones, handheld game consoles, navigation devices or handheld multimedia entertainment devices. These electronic products generally use linear vibration motors for system feedback, such as the call reminder, information reminder and navigation reminder of mobile phones, vibration feedback of game consoles, etc. For such wide applications, the vibration motor is required to have high performance and long service life.

In relevant technologies, the linear vibration motor comprises a base with an accommodation space, a vibrating unit arranged in the accommodation space, an elastic part fixing and suspending the vibrating unit in the accommodation space, and a coil assembly fixed to the base, wherein, the vibrating unit comprises a weight block, a pole plate and magnets, and the coil assembly comprises a coil and an iron core. The magnetic field generated by the coil interacts with the magnetic field generated by the vibrating unit so as to drive the vibrating unit to vibrate by carrying out reciprocating linear motion.

However, the thickness of pole plates as well as the thickness of iron cores in relevant technologies are basically the same. The magnetic lines of force of the magnetic field generated by the coil are intensively blocked in the magnetic field where the pole plate and the iron core are located, and therefore, the magnetic field intensity is weakened, and then the vibration of the vibrating unit is weakened, thus, the vibrating performance of the linear vibration motor is degraded.

Thus, it is necessary to provide an improved linear vibration motor to solve the problems above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present invention.

DETAILED DESCRIPTION OF THE EXEMPLARY EMBODIMENT

The present invention will hereinafter be described in detail with reference to an exemplary embodiments. To make the technical problems to be solved, technical solutions and beneficial effects of the present invention more apparent, the present invention is described in further detail together with the figures and the embodiment. It should be understood the specific embodiment described hereby is only to explain the invention, not intended to limit the invention.

Figure 1:
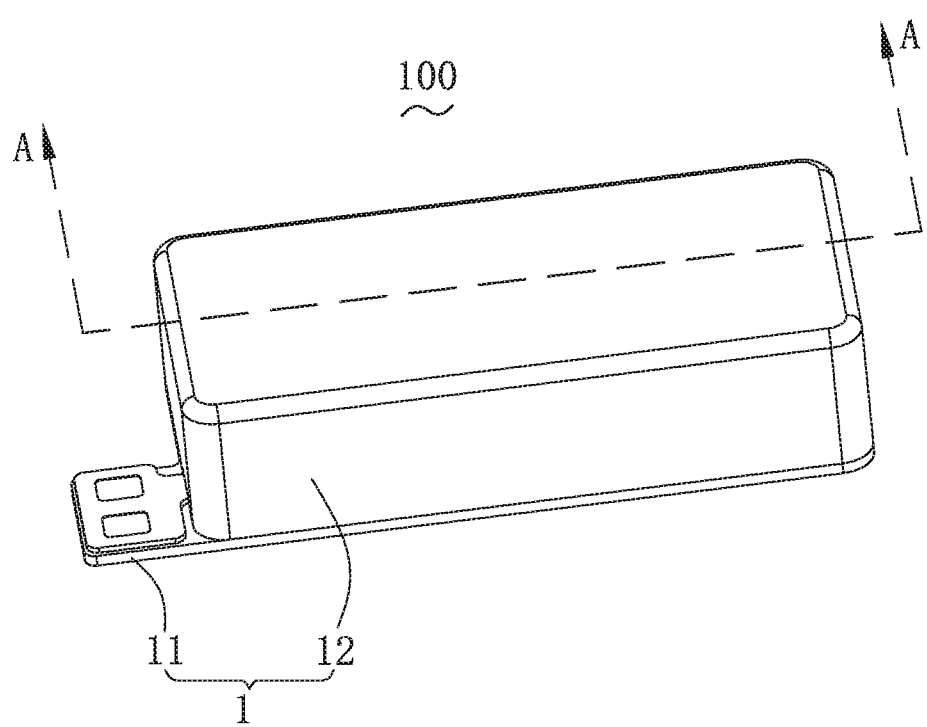
FIG. 1 is an isometric view of a linear vibration motor in accordance with an exemplary embodiment of the present invention.
Figure 2:
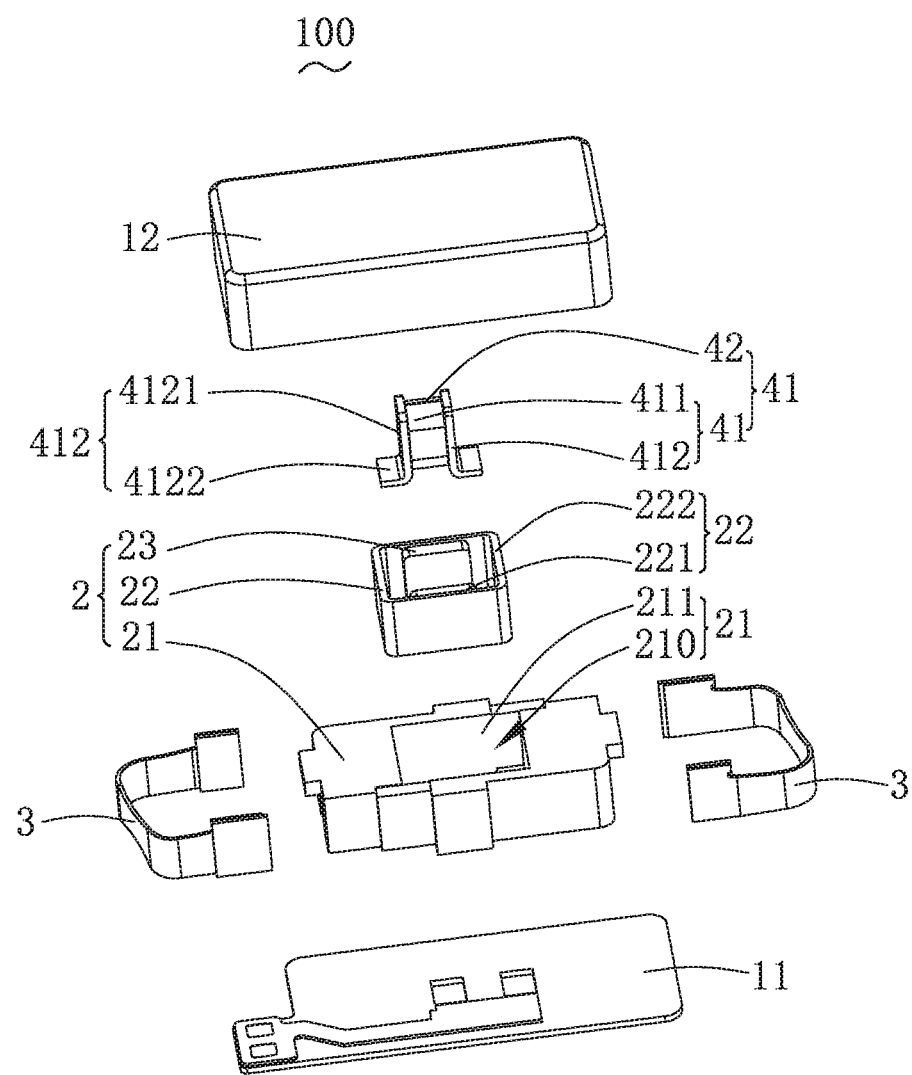
FIG. 2 is an exploded view of the linear vibration motor in FIG. 1.
Figure 3:
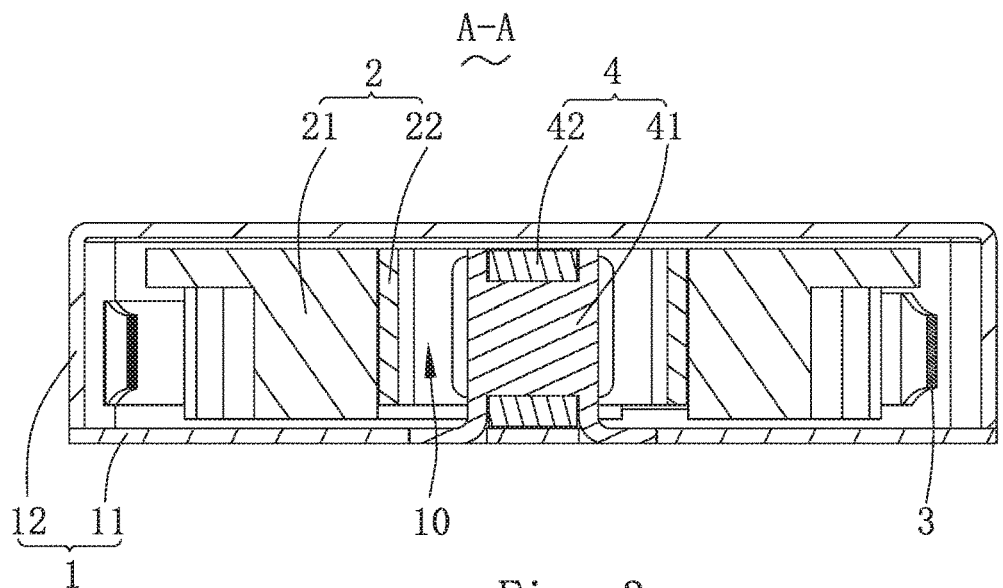
FIG. 3 is a cross-sectional view of the linear vibration motor taken along line A-A in FIG. 1.
Figure 4:
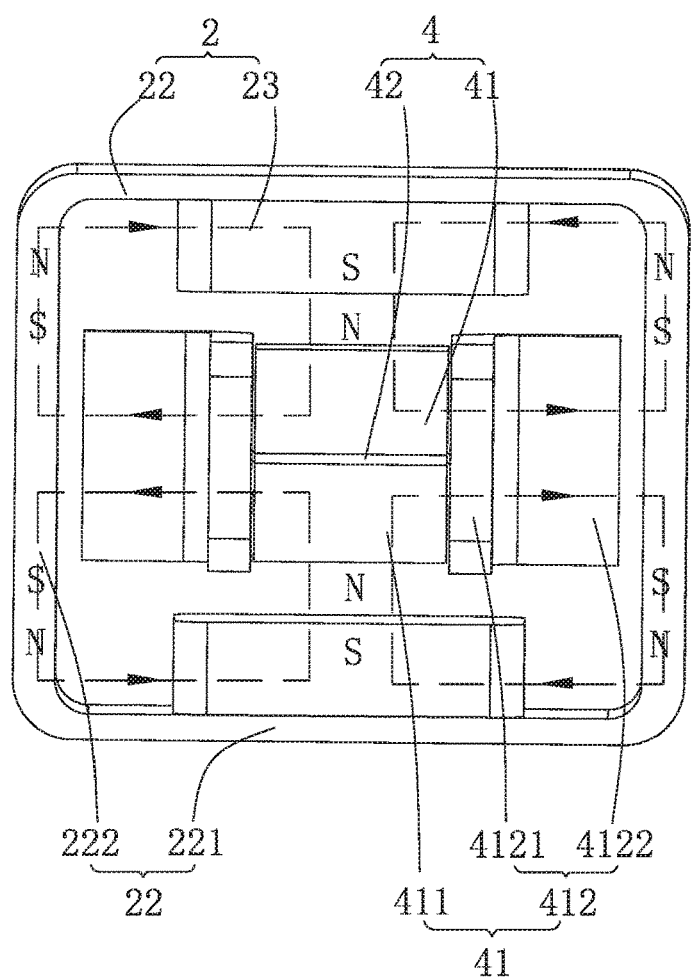
FIG. 4 is a top view of the linear vibration motor, particularly of a magnetic circuit system of the linear vibration motor.

Referring to FIGS. 1-4, the present invention provides a linear vibration motor 100 which comprises a base 1, a vibrating unit 2, an elastic part 3 and a coil assembly 4.

The base 1 comprises an accommodation space 10. The base 1 comprises bottom plate 11 and an upper cover 12, wherein, the upper cover 12 covers the bottom plate 11 and forms the accommodation space 10 with the bottom plate 11.

The vibrating unit 2 is arranged in the accommodation space 10. In the embodiment, the vibrating unit 2 is supported and suspended by the elastic part 3 in the accommodation space 10.

Specifically, the vibrating unit 2 comprises a weight block 21, a pole plate 22 and magnets 23.

The weight block 21 comprises a through hole 210 and a hole wall 211 enclosing the through hole 210. The weight block 21 is made from a nonmagnetic material.

The pole plate 22 is rectangular. The pole plate 22 is accommodated in the through hole 210. Specifically, the pole plate 22 is fixed to the hole wall 211. The pole plate 22 comprises first side walls 221 oppositely arranged with an interval and second side walls 222 oppositely arranged with an interval. Specifically, the first side walls 221 are arranged parallel to the long axis direction of the pole plate 22, and the second side walls 222 are arranged parallel to the short axis direction of the pole plate 22.

Two magnets 23 in total are arranged. The two magnets 23 are arranged at two opposite sides of the pole plate 22, namely, the two magnets 23 are fixed at two opposite sides of the pole plate 22. Specifically, two first side walls 221 in total are arranged, and two second side walls 222 in total are arranged. The two magnets 23 are respectively fixed to the two first side walls 221.

Preferably, the thickness of the second side walls 222 is increased at the position (i.e., the second side walls 222) where the magnetic lines of force are intensively blocked in order to increase the magnetic flux of the pole plate 22, namely, the thickness of the second side walls 222 is greater than the thickness of the first side walls 221, which improves the circulation of magnetic lines of force as well as the magnetic field intensity. The magnetic flux is correspondingly increased for about 10%. Thus, the vibrating performance of the linear vibration motor 100 is improved.

The elastic part 3 suspends the vibrating unit 2 in the accommodation space 10. Specifically, one end of the elastic part 3 is fixed to the vibrating unit 2, and the other end is fixed to the base 1. Specifically, the elastic part 3 and the upper cover 12 are connected, namely, the elastic part 3 is fixed to the upper cover 12 of the base 1.

The coil assembly 4 is fixed to the base 1 and drives the vibrating unit 2 to vibrate. The coil assembly 4 extends to the position between the two magnets 23 and is arranged with intervals from the magnets 23.

Specifically, the coil assembly 4 comprises an iron core 41 and a coil 42 winding the iron core 41, wherein, the iron core 41 is inserted in the through hole 210 and arranged with intervals from the magnets 23.

The iron core 41 comprises an iron core body 411 and an extension part 412, wherein, the iron core body 411 extends along the vibrating direction, and the an extension part 412 extends from two opposite ends of the iron core body 411 and is fixed to the base 1. The coil 42 winds the iron core body 411. The an extension part 412 comprises a connection part 4121 connected with the iron core body 411, and a fixation part 4122 bending and extending from the connection part 4121 and fixed to the base 1.

Of course, improving the magnetic field intensity by increasing the thickness of the second side walls 222 of the pole plate 22 is not the only method. Preferably, the magnetic flux of the iron core 41 can be increased by increasing the thickness of the connection part 4121 at the position, i.e., the connection part 4121 where the magnetic lines of force are intensively blocked, namely, the thickness of the connection part 4121 is greater than the thickness of the fixation part 4122. Thus, the circulation of the magnetic lines of force is improved, the magnetic field intensity is increased, and the vibrating performance of the linear vibration motor 100 is better.

The coil 42 winds the iron core body 411 and is arranged between the two magnets 23. After the coil 42 is electrified, the iron core 41 generates a magnetic field which interacts with the magnetic field of the magnets 23 so as to drive the vibrating unit 2 to perform reciprocating linear motion and generate the vibrating effect.

Compared with relevant technologies, the pole plate of the linear vibration motor of the present invention comprises the first side walls and the second side walls, wherein, the magnets are fixed to the first side walls, and the thickness of the second side walls of the pole plate is increased, namely, the thickness of the second side walls is greater than the thickness of the first side walls. Without influencing the overall volume, the linear vibration motor partially enlarges the pole plate so as to improve the circulation of magnetic lines of force as well as the magnetic field intensity, and then the magnetic flux is increased correspondingly so as to make the vibrating performance of the linear vibration motor better.

It is to be understood, however, that even though numerous characteristics and advantages of the present exemplary embodiment have been set forth in the foregoing description, together with details of the structures and functions of the embodiment, the invention is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor including
a base with an accommodation space;
a vibrating unit, arranged in the accommodation space, comprising a weight block with a through hole, a pole plate accommodated in the through hole, and at least one magnet fixed at two opposite sides of the pole plate;
an elastic part suspending the vibrating unit in the accommodation space;
a coil assembly fixed to the base for driving the vibrating unit to vibrate; wherein
the pole plate comprises first side walls oppositely arranged with an interval and second side walls oppositely arranged with an interval; the at least one magnet is fixed to the first side wall, and a thickness of the second side wall is greater than a thickness of the first side wall.

2. The linear vibration motor according to claim 1, wherein the first side walls are parallel to a long axis direction of the pole plate, and the second side walls are parallel to a short axis direction of the pole plate.

3. The linear vibration motor according to claim 1, wherein the base comprises an upper cover connected with the elastic part, and a bottom plate fixed to the upper cover for forming the accommodation space; the coil assembly comprises an iron core and a coil winding the iron core, and wherein, the iron core is inserted in the through hole, spaced from the magnets, and fixed to the bottom plate.

4. The linear vibration motor according to claim 1, wherein the weight block is made from a nonmagnetic material.

* * * * *